(12) United States Patent
Tingleff et al.

(10) Patent No.: US 6,250,151 B1
(45) Date of Patent: Jun. 26, 2001

(54) FLUID FLOW METER INCORPORATING MAGNETIC DETECTOR

(75) Inventors: Michael Tingleff, Klarup; Willi Miller, Fjerritslev, both of (DK); Manfred Kopl, Bochum (DE); Alfons Harding, Jamestown, NC (US)

(73) Assignee: Marconi Commerce Systems GmbH & Co. KG, Salzkotten (DE)

( * ) Notice: Subject to any disclaimer, the term of this patent is extended or adjusted under 35 U.S.C. 154(b) by 0 days.

(21) Appl. No.: 09/077,741
(22) PCT Filed: Dec. 29, 1996
(86) PCT No.: PCT/EP96/04689
§ 371 Date: Mar. 8, 1999
§ 102(e) Date: Mar. 8, 1999
(87) PCT Pub. No.: WO97/16706
PCT Pub. Date: May 9, 1997

(30) Foreign Application Priority Data

Oct. 30, 1995 (DK) ................................... 1215/95

(51) Int. Cl.$^7$ ...................................... G01F 3/04
(52) U.S. Cl. ............................ 73/261; 73/253; 73/861.77
(58) Field of Search ...................... 73/261, 253, 861.77, 73/861.78, 861.88, 861.89; 418/191

(56) References Cited

U.S. PATENT DOCUMENTS

| | | | | |
|---|---|---|---|---|
| 3,969,940 | * | 7/1976 | Butcher | 73/253 |
| 4,224,015 | * | 9/1980 | Nagata | 73/261 |
| 4,295,369 | * | 10/1981 | Wendelboe | 73/261 |
| 4,641,522 | * | 2/1987 | Lopresti | 73/261 |
| 4,872,352 | * | 10/1989 | Alden et al. | 73/861.77 |
| 4,878,454 | * | 11/1989 | Cann | 73/261 |
| 4,911,010 | * | 3/1990 | Foran et al. | 73/261 |
| 4,996,888 |   | 3/1991 | Foran, Jr. et al. | 73/261 |
| 5,251,149 | * | 10/1993 | Williams et al. | 73/861.77 |
| 5,252,824 | * | 10/1993 | Picanyol | 73/861.77 |
| 5,325,715 | * | 7/1994 | Foran et al. | 73/861.77 |
| 5,447,062 | * | 9/1995 | Köpl et al. | 73/261 |
| 5,559,288 |   | 9/1996 | Schumacher | 73/261 |
| 5,594,173 | * | 1/1997 | Frey et al. | 324/207.12 |

FOREIGN PATENT DOCUMENTS

| | | |
|---|---|---|
| 4042397 | 7/1992 | (DE) . |
| 4208869 | 9/1993 | (DE) . |
| 4423461 | 1/1996 | (DE) . |
| 93/12405 | 6/1993 | (WO) . |

* cited by examiner

*Primary Examiner*—Harshad Patel
(74) *Attorney, Agent, or Firm*—Venable; Robert J. Frank; Robert Kinberg

(57) ABSTRACT

A device for measuring fluid volume output by a pump includes a meter housing having an inlet and an outlet through which the fluid flows. At least two inter-engaging screw spindles are rotatably mounted within the meter housing and are rotatable in response to fluid flow in an axial direction through the housing. An exciter disc is arranged in the fluid flow in the meter housing and connected to one of the at least two inter-engaging screw spindles for rotation therewith. The exciter disc has at least one substantially planar surface and a plurality of magnets circularly arranged thereon with their fields in an axial direction relative to the exciter disc. The meter housing is configured to form a gap and the exciter disc penetrates the gap, whereby a region of the meter housing is in close proximity to and extends over a portion of the planar surface of the exciter disc. At least two magnetic-sensitive detectors are disposed in the region of the meter housing proximate to and spaced from the exciter disc for cooperating with the magnets of the exciter disc for producing a signal representing rotation of the exciter disc.

14 Claims, 4 Drawing Sheets

FLUID FLOW METER INCORPORATING MAGNETIC DETECTOR

BACKGROUND OF THE INVENTION

The invention concerns a flow meter, particularly for liquid fuels in petrol pumps, with at least two inter-engaging screw spindles through which liquid can flow in the axial direction and which are mounted at their ends in a housing so as to rotate, wherein the housing includes a measuring chamber through which liquid can flow and in which an exciter disc, which is rigidly connected to one of the spindle, can rotate in order to cooperate with a detector at the housing end.

A generic flow meter is known from EP 05 72 621. The flow meter disclosed therein is used in petrol pumps for liquid fuels, such as Petrol, Diesel or similar. High levels of accuracy are demanded from such measuring arrangements, the device must be able to be calibrated and, in addition, a device of this type must be relatively inexpensive in manufacture and have a long service life. The measuring device described contains a case, in which two intermeshing screw spindles are arranged. The screw spindles are mounted at each end, so as to rotate with easy action. The outer flanks of the screw spindles rotate very closely to the inner case wall in corresponding bores. From one of the axial directions the fluid to be measured flows into the spindle arrangement where the rate of its flow causes the spindles to rotate. The fluid leaves the spindle arrangement at the opposite axial direction and passes through a measuring chamber, in which an exciter disc, which is rigidly connected to one of the spindles, is allowed to rotate. The exciter disc, rotating in the flow of the fluid, co-operates with a detector at the housing end, which receives information on rotational speed transmitted by the exciter disc and which feeds this to an electronic evaluation circuit to convert the measured pulses into values of volume. From DE 42 08 869 a device is also known to determine the volumetric flow in a fuel line. In that case a steel pole wheel is fitted to the end of a spindle which co-operates with an inductive proximity switch. To enable identification of the direction of rotation of the spindles, two proximity switches are provided and screwed into the housing, opposite but offset to each other, and reaching into the fluid flow within the measuring chamber. The disadvantage of such proximity switches is their complex method of assembly, since they have to be screwed into appropriately tapped holes in the measuring chamber and are then directly positioned within the flameproofed section of the measuring arrangement. In addition, proximity switches require a large cross section of the measuring chamber flow channel.

Correct operation of a generic flow meter assumes, that the spindles are allowed to rotate with a minimum application of force. This requires, that the braking action caused by an exciter disc, rotating within the fluid, is minimised.

SUMMARY OF THE INVENTION

It is a object of the invention to improve manufacturing techniques and operational functions of such a generic device.

Such purpose is met by the invention wherein there is provided a device for measuring fluid volume output by a pump, comprising: a meter housing having an inlet and an outlet through which the fluid flows; at least two inter-engaging screw spindles rotatably mounted within the meter housing and being rotatable in response to fluid flow through the housing; an exciter disc arranged in the fluid flow in the meter housing and connected to one of the at least two inter-engaging screw spindles for rotation therewith, the exciter disc having at least one substantially planar surface and a plurality of magnets arranged thereon with their fields in an axial direction relative to the exciter disc, wherein the meter housing is configured to form a gap and the exciter disc penetrates the gap whereby a region of the meter housing is in close proximity to and extends over a portion of the planar surface of the exciter disc; and at least two magnetic-sensitive detectors disposed in said region of the meter housing, proximate to and spaced from the exciter disc, for cooperating with the magnets of the exciter disc for producing a signal representing rotation of the exciter disc.

Because of the configuration of the invention, the exciter disc rotates in a partially screened area, having the shape of a gap. This produces minimum braking action by the exciter disc on the flowing medium. The effect is further enhanced by the smooth edging of the disc, whereby a "paddlewheel effect", as is possible in devices according the current state of the art, is prevented. The gap formation allows the scanning of the exciter disc from its flat surface. For this purpose, at least two detectors are provided in the region of the wall gap, which respond to magnetic fields. The disc carries two magnets or has two magnetic areas which act in an axial direction whereby the magnetic flux lines pass virtually across the gap wall. For preference, Hall effect sensors are used as detectors for the magnetic field. Such Hall effect sensors are preferably fitted into a detector chamber, which is accessible from outside and which is separated from the measuring chamber by an aluminium wall so that the sensors are no longer within the flameproof area of the flow meter. Such measures significantly reduce the demands that have to be made on the sensors. Assembly too is simplified, since the screwing of the sensors into threads contained in the housing may now be omitted. For preference, the detector chamber is assigned to a part of the housing, which is mounted onto the screw spindle chamber. This simplifies assembly, since the separation level is in the region of the gap. For preference the exciter disc comprises eight magnets, which are uniformly disposed in a circle on the disc. The magnets may be oriented either in parallel or, alternating, in antiparallel. The gap wall facing the spindle housing is partly formed in a further advantageous development of the invention by a screen covering one of the spindle bearings and having an aperture, through which the liquid may flow in an axial direction. The detector housing reaches into the measuring chamber approximately up to the axis of the spindle, respectively of the exciter disc, so that about one half of the disc penetrates the gap. This reduces the forces acting upon the disc by the flow of the fluids. In addition, the disc is very flat; its thickness is many times smaller than its diameter, thereby reducing its moment of inertia. This reduces non-linear errors.

The invention prevents the projection of components into the D-shaped measuring chamber. Electrical components, when contained in the separate detector chamber, may be easily screened, both from external magnetic or electric influences and from the measured fluid medium. At least two Hall effect sensors, arranged in the detector chamber, may be positioned exactly so as to obtain information on phase angles and, thereby, providing information on the direction of rotation of the disc. The magnetic disc segments, which act by their faces, consist of soft and small magnetic formations, arranged in a circle around the disc centre. The measuring chamber cross section in the region of the exciter disc is greater than or equal to the smallest cross section of the path of the fluid. This arrangement limits fluid accelerations in the region of the exciter disc to within the tolerable range.

The invention is described in detail below and on hand of the drawings appended. Depicted are:

DETAILED DESCRIPTION OF THE DRAWINGS

According to the invention the flow meter has an elongated shape. A housing 1 contains two meshing screw spindles, forming a closed volume. The spindles are held in ball bearings 18 for ease of operation. Ball bearings 18 are in each case arranged at the ends of screw spindles 2, 3. One of the two screw spindles carries an exciter disc 4 at its outlet end, which is screwed onto the end of the spindle.

Figure 1:
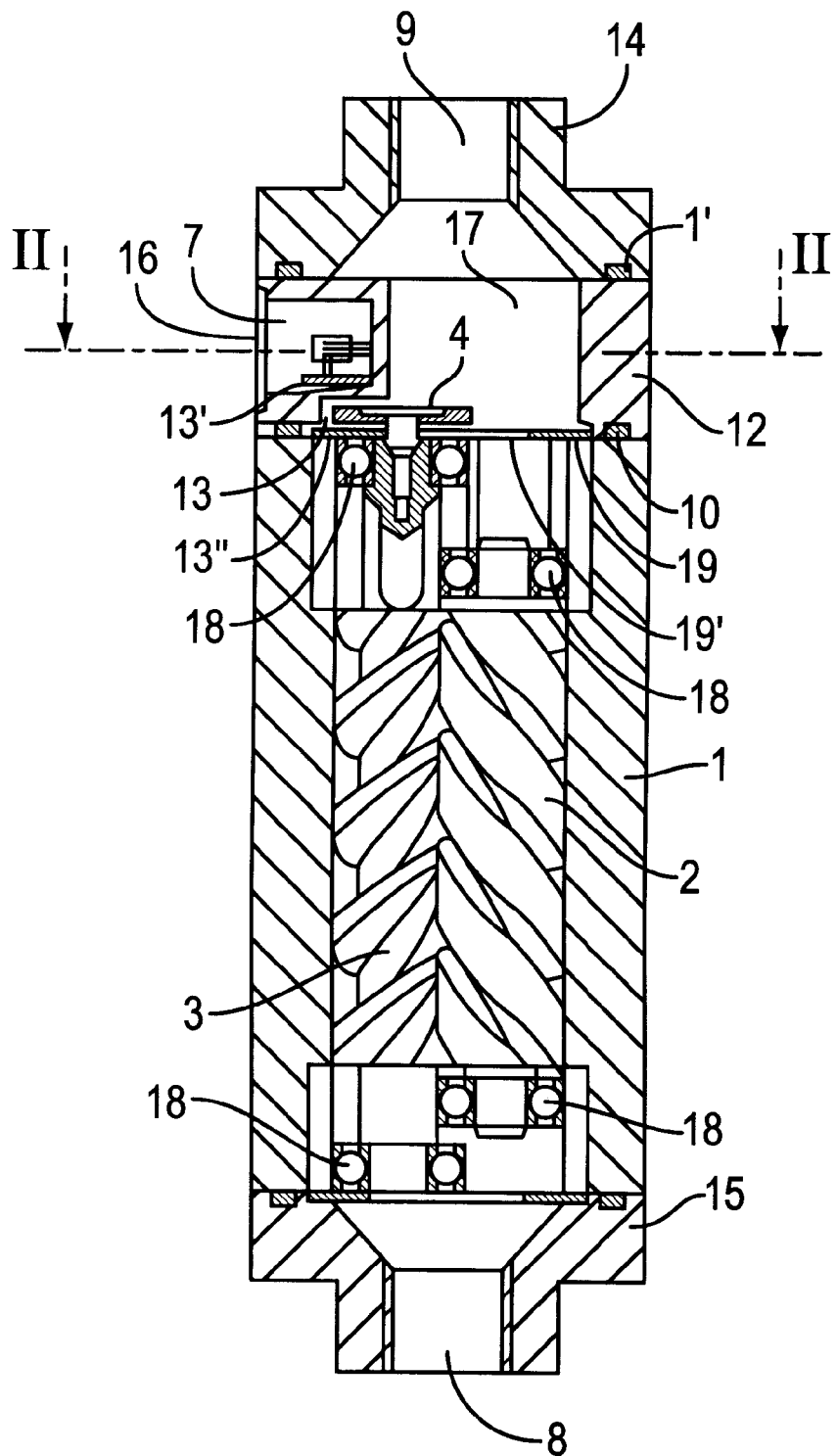
FIG. 1 The cross section of the device according to the invention
Figure 2:
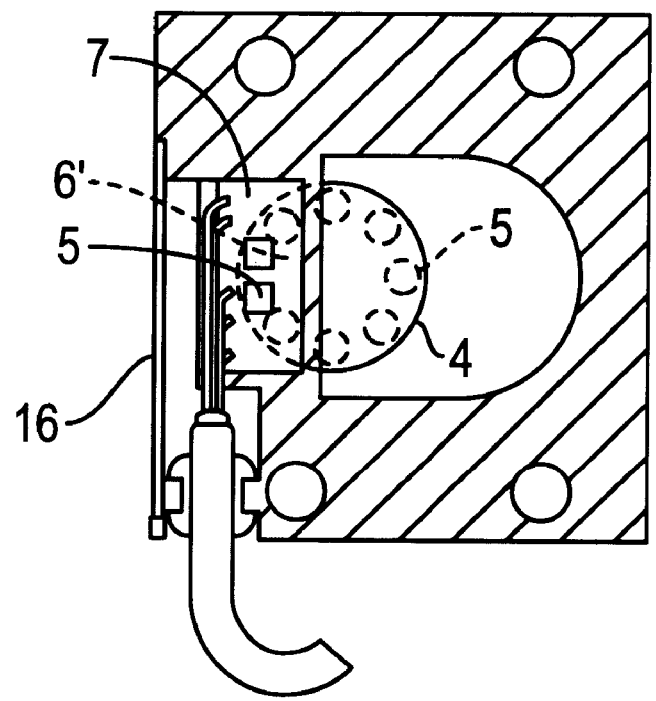
FIG. 2 a section along line II—II in FIG. 1.
Figure 3:
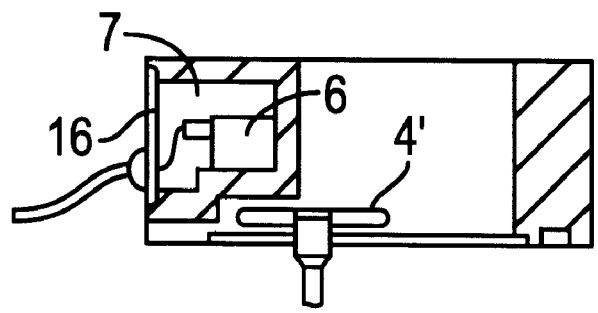
FIG. 3 a section from FIG. 1 in the region of the measuring chamber

An inlet flange 15 is mounted at the inlet of spindle housing 1, having an axial inlet opening 8 through which the fluid is pumped into the spindles. At the opposite end of spindle housing 1 a detector housing assembly 12 is mounted, having a seal 10. The detector housing assembly 12 provides a chamber, which is assessable from outside and which is separated from the measuring chamber 17 by an isolating partition. The detector housing assembly 12 is followed in the axial spindle direction by an outlet flange 14, which is similar in construction to inlet flange 15 and which has an outlet orifice 9, also in axial direction. Between housing parts 1 and 12 and in the region of seal 10 a screen 19 is provided, which covers bearing 18, supporting one end of spindle 3. Screen 19 has a central aperture 19' through which the fluid exits. A screw protrudes through aperture 19' to form the axle for disc 4 and whereby disc 4 is rigidly connected to spindle 3. Screen 19 forms a wall 13" of gap 13 through which about one half of disc 4 rotates. The opposite wall 13' is formed by the partition of detector chamber 7 which is contained within housing assembly 12. The partition wall of detector chamber 7 is parallel to the surface of disc 4. As can be seen—particularly from FIG. 2—the equally spaced magnets 5, which are disposed on disc 4, pass through gap 13 and along partition wall 13'.

Within detector chamber 7 magnetic field sensors are arranged adjacent to each other—in the example shown there are two, 6, 6'. The spacing of detectors 6, 6' differs from that of the magnets on the disc, so as to be able to determine the phase angle of disc 4 and thereby its direction of rotation. Detector chamber 7 has a cable feed-through for the connecting lead to the Hall effect sensors 6, 6'. In addition, the chamber is provided with a lid 16 to allow closure of the chamber after assembly of the detectors 6, 6', which, for example, could be mounted onto a printed circuit board.

Disc 4 is mounted as axial extension of spindle 3 and is provided with a plurality of discrete magnets. Disc 4 is about half-blanked by wall 13' of detector chamber 7, and the disc partially rotates within a gap. Disc 4 has a smooth surface and otherwise penetrates into a D-shaped measuring chamber 17, through which the fluid flows. If liquid is pumped into screw spindles 2, 3, then these are made to rotate. Disc 4, which now also rotates, generates an alternating magnetic field which is detected by the Hall effect sensors 6, 6'. The sensors therefore supply a defined pulse signal which is taken by cable for signal processing.

Although disc 4 rotates within the fluid flow, it has been shown that the device according to the invention prevents inadmissible influence through friction which could interfere with linearity.

It is particularly advantageous, to allocate a separate housing component for the Hall effect sensors 6, 6' within the housing assembly 12.

Figure 4:
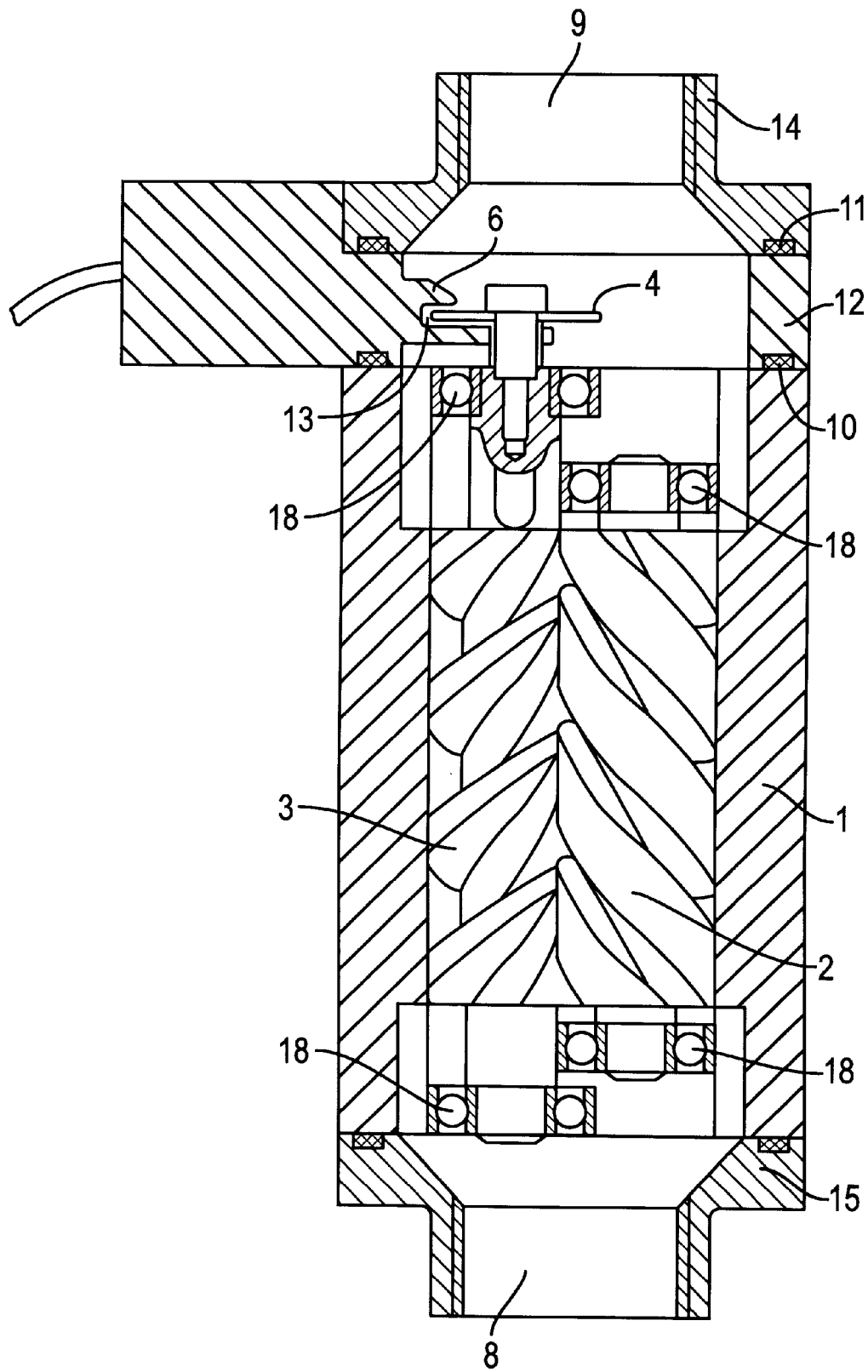
FIG. 4 a second example of the invention.
Figure 5:
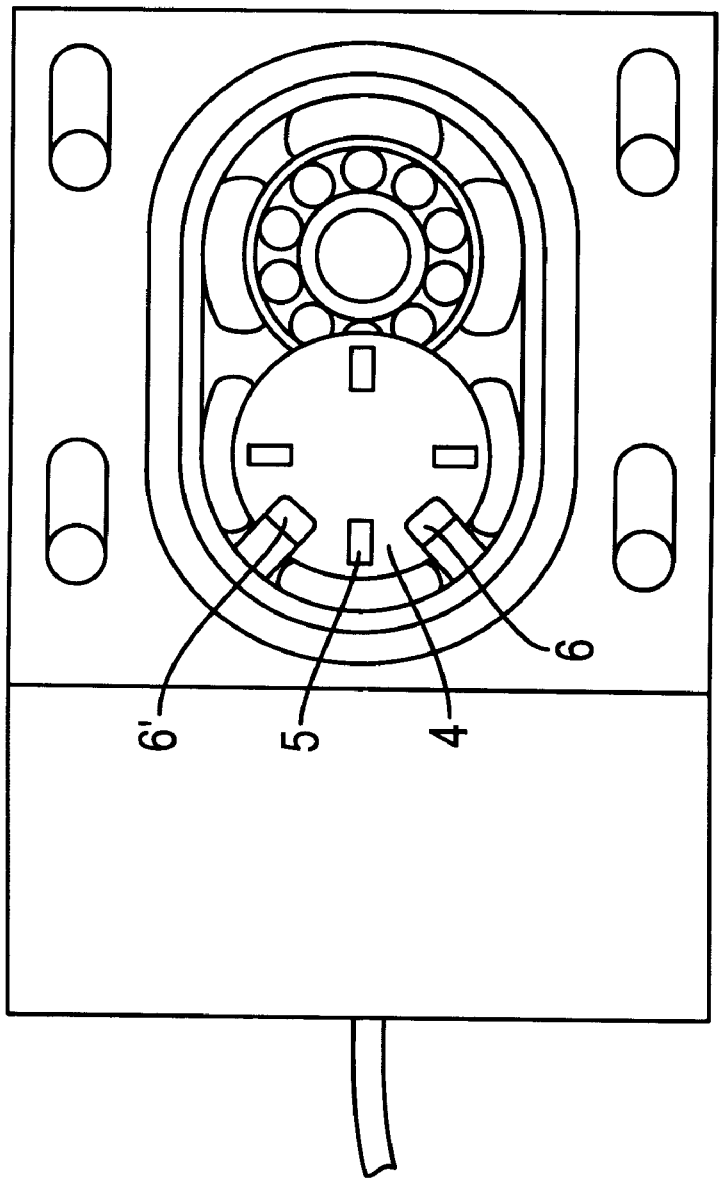
FIG. 5 a section through the measuring chamber of the example of FIG. 4.

In the versions depicted in FIGS. 4 and 5, disc 4 revolves within a gap 13, which is formed by two parallel extensions of housing assembly 12. Two of these extensions, 6, 6' are fashioned into supports for detectors, which extend over the surface of disc 4 to detect the magnets 5 which have been applied to the disc and when these pass below the sensors.

All features disclosed are significant inventions. By disclosing the application, the contents of the disclosures of priority documents which form part or are appended (copy of prior application) are deemed to be fully included, including for the purposes of adaptation of features of such documents in this present claim. The content of this disclosure expressly includes the full contents of the German translation of the Danish priority application.

What is claimed is:

1. A device for measuring fluid volume, comprising:
   a meter housing having an inlet and an outlet through which the fluid flows;
   at least two inter-engaging screw spindles rotatably mounted within the meter housing and being rotatable in response to fluid flow in an axial direction through the housing;
   an exciter disc arranged in the fluid flow in the meter housing and connected to one of the at least two inter-engaging screw spindles for rotation therewith, the exciter disc having at least one substantially planar surface and a plurality of magnets arranged thereon with their fields in an axial direction relative to the exciter disc, wherein the meter housing is configured to form a gap and the exciter disc penetrates the gap whereby a region in the meter housing accessible from outside the meter housing is in close proximity to and extends over a portion of the planar surface of the exciter disc; and
   at least two magnetic-sensitive detectors disposed in said region of the meter housing proximate to and spaced from the exciter disc, for cooperating with the magnets of the exciter disc for producing a signal representing rotation of the exciter disc, wherein said at least two magnetic sensitive detectors are accessible in said region from outside the meter housing.

2. A device according to claim 1, wherein the detectors are Hall Effect sensors.

3. A device according to claim 1, wherein the meter housing has a measuring chamber through which the fluid flows, including a detector chamber, in which the detectors are disposed, with a wall proximate to the exciter disc forming the gap.

4. A device according to claim 3, wherein the meter housing includes a spindle housing section having the at least two inter-engaging spindles disposed within and a housing section mounted on the spindle housing section, the housing section enclosing the detector chamber.

5. A device according to claim 3, wherein the one spindle to which the exciter disc is connected has a spindle bearing, and further comprising:
   a screen disposed in the meter housing above the spindle bearing and opposite the wall proximate the exciter disc, the screen having a central aperture through which fluid exits.

6. A device according to claim 3, wherein a flow channel in the measuring chamber in a region of the exciter disc has a cross-sectional area which is greater than or equal to the smallest cross-sectional area of the fluid flow.

7. A device according to claim 3, wherein the detector chamber contains more than two hall effect sensors.

8. A device according to claim 1, wherein the exciter disc carries magnets uniformly disposed in a circle on the disc.

9. A device according to claim 8, wherein the exciter disc carries eight (8) magnets.

10. A device according to claim 1, wherein the diameter of the exciter disc corresponds approximately to the diameter of the one inter-engaging screw spindle.

11. A device according to claim 1 wherein exciter disc is a circular disc, having a smooth surface.

12. The device according to claim 1, wherein the device constitutes a device for measuring liquid fuel in a petrol pump.

13. A method of measuring liquid fuel volume output by a petrol pump, comprising utilizing the device according to claim 1.

14. A meter for measuring fluid flow comprising:

a meter housing defining a chamber, the chamber having a fluid inlet and a fluid outlet;

two inter-engaging screw spindles within the chamber rotatably mounted between the inlet and outlet whereby fluid flows axially relative to the spindles, the spindles being arranged such that fluid flow urges the spindles to rotate;

an exciter disc within the chamber, the exciter disc comprising a plurality of magnets and being connected to one of the screw spindles; and at least two magnetic-sensitive detectors mounted outside of the chamber in a region that extends over the exciter disc proximate to said magnets within said chamber and accessible from outside the chamber, which sensors cooperate with the magnets to detect rotation of the exciter disc.

* * * * *